United States Patent [19]
Faco et al.

[11] Patent Number: 5,218,651
[45] Date of Patent: Jun. 8, 1993

[54] OPTICAL FIBRE INCORPORATING A VARIABLE INTERNAL BRAGG GRATING AND ITS APPLICATIONS

[75] Inventors: Paul Faco, Panazol; Philippe Di Bin, Limoges; Paul-Hubert Zongo, Couzeix, all of France

[73] Assignee: Gaz de France, Paris, France

[21] Appl. No.: 856,677

[22] Filed: Mar. 24, 1992

[30] Foreign Application Priority Data

Mar. 25, 1991 [FR] France .................... 91 03592

[51] Int. Cl.⁵ .............................................. G02B 6/16
[52] U.S. Cl. ........................................... 385/4; 385/37
[58] Field of Search .................. 372/6; 385/4–10, 385/37

[56] References Cited

U.S. PATENT DOCUMENTS

| | | | |
|---|---|---|---|
| 4,013,365 | 3/1977 | Vali et al. | 372/94 |
| 4,546,476 | 10/1985 | Shaw et al. | 372/6 |
| 4,725,110 | 2/1988 | Glenn et al. | 350/3.61 |
| 4,807,950 | 2/1989 | Glenn et al. | 350/3.61 |
| 4,847,521 | 7/1989 | Huignard et al. | 372/21 |
| 4,867,522 | 9/1989 | Cassidy | 350/96.19 |
| 5,048,026 | 9/1991 | Shaw et al. | 372/6 |
| 5,064,288 | 11/1991 | Dyes et al. | 372/6 |

FOREIGN PATENT DOCUMENTS

2501872 9/1982 France .

OTHER PUBLICATIONS

K. Pennington et al. "Fast Amplifying Opto-Optical Switch," IBM Technical Disclosure Bulletin, vol. 14, No. 7, Dec. 7, 1991, pp. 2035–2036.

G. Ball, "Fiber Laser Incorporating Internal Bragg Reflectors," LEOS '90 Conference Proceedings, vol. 2, Nov. 4, 1990, pp. 96–97.

Y. Kimura, "Ultra-Efficient Erbium-doped Fiber Amplifier," Applied Physics Letters, vol. 57, No. 25, Dec. 17, 1990, pp. 2635–2637.

C. Millar, "Efficient Up-Conversion Pumping at 800 nm of an Erbium-Doped Fluoride Fiber Laser Operating at 860 nm", Electronics Letters, vol. 26, No. 22, Oct. 25, 1990, pp. 1871–1873.

C. Chen, "High Gain Erbium Doped Fiber Amplifier and Tunable Erbium Doped Fiber Laser Pumped at 522 nm", OFCC 1990 Technical Digest Series, vol. 1 Conference Edition, Paper FA3, Jan. 22, 1990, San Francisco, Calif.

Primary Examiner—John D. Lee
Assistant Examiner—John Ngo
Attorney, Agent, or Firm—Pollock, Vande Sande & Priddy

[57] ABSTRACT

Optical fibre device having a core and coaxial sheath. The core and coaxial sheath provides a light amplifier when optically pumped. Interfering optical waves incident to the fiber having a predetermined intensity and wavelength inscribe an ephemeral periodic index strata grating over at least part of the fiber core when the core is illuminated. In the absence of illumination by interfering waves, the grating disappears.

12 Claims, 4 Drawing Sheets

OPTICAL FIBRE INCORPORATING A VARIABLE INTERNAL BRAGG GRATING AND ITS APPLICATIONS

The invention relates to the field of optical fibres incorporating a Bragg lattice or grating which is variable in orientation and in chromatic reflectivity. These devices are useful in applications as a deflector, selective extractor of flux, light injector, fibre-optic coupler and fibre-optic sensor, in particular.

The development of optical fibres and of their applications has given rise to the availability of fibre-based components fulfilling the same functions or at least functions which are analogous to those which are customarily performed by conventional optical components.

Other fibre-optic components are more specific, and it is difficult to find their counterparts in conventional optics.

Accordingly, optical fibres incorporating a Bragg lattice have been developed.

Such fibres are described in the American Patents U.S. Pat. Nos. 4,725,110, 4,806,012 and 4,807,950.

According to the technique described in these documents, a fibre, of glass or of silica doped with germanium, is treated in such a manner as to constitute within the fibre a Bragg grating.

This lattice is composed of parallel, plane strata of constant index, the index varies from one stratum to the next, and its variations are periodic and the period is represented by the spatial period I. All the parameters of these lattices are constant (length, spatial period when inoperative, orientation . . .).

It is shown from these documents, that the luminous flux of a signal wave coupled into the fibre, which luminous flux is reflected by such a Bragg lattice, has characteristics which are each a function of its spatial period.

The spatial period is determined by the conditions of production of the Bragg lattice. It is capable of being slightly modified when the fibre is subjected to longitudinal strains.

The permanent Bragg lattice is obtained by subjecting an optical fibre to the interference lattice, also referred to as the fringe lattice, produced by the intersection of two ultra violet beams originating from one and the same source.

The various strata of the fibre are subjected to variable illuminations which involve definitive corresponding modifications of index which are a function, at each point, of the illumination received. As the distribution of the intensity within the interference fringes is sinusoidal, of spatial period I, they produce variations of index of the same period.

The spatial period and the length of the Bragg lattice are accordingly determined by the conditions of production of the interference (angle of the beams, position of the fibre in relation to the fringes in the course of illumination . . . ).

It is emphasized in these documents of the prior art that these fibres including Bragg lattices are capable of being utilized as a strain gauge. In fact, when the fibre is subjected to longitudinal strains the spatial period of the Bragg lattice is modified. This involves a modification of the characteristics of the reflected flux. Accordingly, the analysis of this flux permits the isolation of a quantity which is a function of the longitudinal strain to which the fibre is subjected. It is also emphasized that the flux reflected by the Bragg lattice is also dependent upon the temperature, and that the utilization of two Bragg lattices, which are possibly superposed, permits the isolation of the contribution of the longitudinal strain to the modification of the reflected flux characteristics.

SUMMARY OF THE INVENTION

The object of the present invention is the design of a novel optical component including at least one fibre incorporating an internal Bragg lattice, in which the orientation of the strata and the chromatic reflectivity may be variable and which, in contrast to the strata of the fibres of the aforementioned prior art (U.S. Pat. No. 4,725,110 . . . ), incorporates "temporary" or "ephemeral" strata, the modifications of the refractive index which are produced by the illumination of the fibre not being irreversible or definitive. Such a component permits the implementation of numerous functions and measures.

Thus, and more specifically, the optical component of the invention will accordingly include:
  an optical fibre having at least one core and a sheath, the core being composed of a material which becomes light amplifying by optical pumping;
  and means for production of pumping wave(s) generating within the fibre at least one variable interference field, this field including optical fringes creating, within the amplifying material of said fibre, strata extending over at least a part of the core of the latter.

The interference field thus generated will accordingly be present only while, or as long as, the pumping waves are present. In other words, it will disappear when the fibre is no longer illuminated.

Thus, in the invention, two characteristics are combined:
  a) Firstly, the material which constitutes the core of the fibre exhibits optical amplification characteristics, permitting this core to act as a light amplifier when optically pumped and
  b) The strata created in the course of illumination are ephemeral, in that they disappear when the fibre is no longer illuminated, thus being linked to the characteristics of the pumping waves applied to the fibre.

Furthermore, another feature of the invention provides that advantageously, the strata being distributed periodically, their spatial frequency (or "pitch") and/or their refractive index will be variable with time, essentially as a function of the intensity, of the wavelength and/or of the angle of mutual inclination of the pumping waves, as well as of the nature of the material chosen to constitute the core (with regard to the refractive index). In practice, the component of the invention may fulfill the function of optical filter by variation of the interference field.

Such an interference field may furthermore, in a complimentary manner, have a position, a length and/or an inclination which are variable over at least a part of the core of the fibre.

Preferably, the means for production of the interference field of the pumping wave includes means for production and for separation of an incident flux into two waves and means for recombination of these two waves, the recombination means permitting the adjustment of the spatial period and the number of strata, as well as their position and their inclination in relation to the fibre.

The characteristics of the interference field may be directly controlled in such a manner as to act on a signal wave coupled at the optical fibre.

In other embodiments, the characteristics of the interference field and thus of the Bragg lattice are dependent upon one or more external parameters. The flux guided within the fibre is utilized for the purpose of remotely measuring the characteristics of the lattice and thus of establishing the external parameter or parameters upon which they depend.

In certain embodiments, the means for production of the interference field of the pumping wave include at least one prism acting on one of the two waves and permitting the adjustment of the spatial period and the orientation of the fringes.

Before giving a more detailed description of the invention with reference to the accompanying drawings, it will be recalled that the technique of "optical pumping" consists in the placing of a medium in a condition of atomic population inversion with a view to the creation therein of the amplification of light waves. This is, in particular, achieved by illuminating the medium by at least one light wave referred to as the "pumping wave", the wavelength of which advantageously corresponds to absorption lines of the amplifying medium. Within the context of such a pumping, the medium almost resumes its initial condition (prior to pumping) after a relaxation time which is customarily of the order of one ms. The optical power levels required for these pumpings are, in general, of the order of one milliwatt (mW). By way of comparison, the achievement of temporary variable interference fields, essentially in plane guides (see, for example publication EP-A-0,254,509) on the basis of non-linear effects, requires optical power levels of the order of one megawatt (MW) or even one gigawatt (GW). The dopant materials utilized are different and the relaxation times are then much shorter. Furthermore, the applications are different.

DESCRIPTION OF THE PREFERRED EMBODIMENTS

Figure 1:
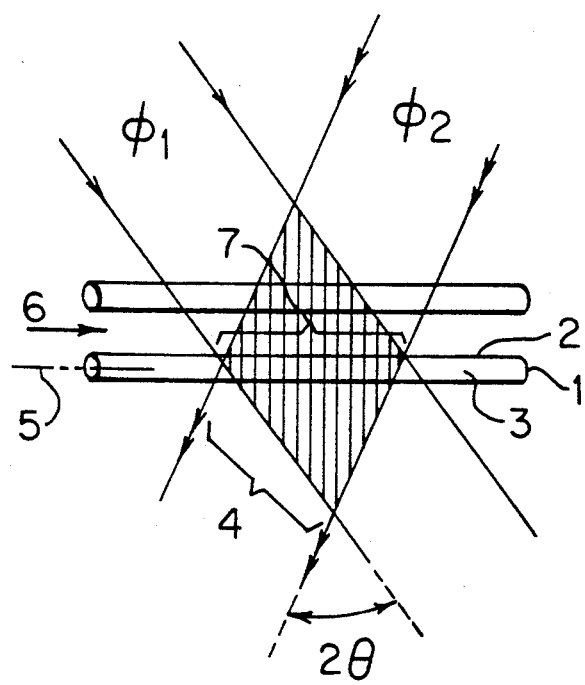
FIG. 1 is a basic diagram of the device of the invention

The invention makes use of an optical fibre, the core of which is composed of an active medium which is capable of thus being optically pumped. The index of the core of such a fibre, for a given wavelength of the signal wave which is coupled thereat, is a function of the illumination which it receives at a given wavelength referred to as the pumping wavelength. Furthermore, the signal wave is amplified.

The adapted illumination of such a fibre by a lattice of fringes of variable luminous intensity, using the pumping wave, produces gain stratifications. These gain variations, which are reversible, produce for the signal wave variations of refractive index which are themselves reversible or ephemeral.

This property is utilized for the purpose of forming within an optical fibre Bragg lattices, of which all the properties: existence itself, total length of the lattice, spatial period, orientation of the lattice in relation to the axis of the fibre are controllable and variable.

The component thus constituted is capable of receiving numerous and varied applications. It may constitute one of the elements of a deflector, of a polarizer, of a coupler, of a sensor etc.

This component includes an optical fibre 1 having a core 2 and a sheath 3. The core is composed of an amplifying material.

Moreover, it further includes means for production of interferences 4 of a spatial period and position which are variable over at least a part of the core 2 of the optical fibre 1.

The interference fringes constitute periodic variations of illumination in the direction 5 of the axis of the optical fibre. These variations of illumination produce, by the action of the active medium constituting the core 2 of the fibre 1, variations of the refractive index of the core in the direction of the axis 5.

Thus, a luminous flux 6 coupled into the optical fibre 1 encounters these periodic variations of index which constitute a Bragg lattices 7.

This Bragg lattice 7 acts on the flux 6, reflecting a part of the latter when the strata making up the Bragg lattice are perpendicular to the axis of the fibre, producing the extraction, out of the core of the fibre, of a part of this flux 6 when these strata are inclined in relation to the axis 5 of the fibre 1.

Conversely, it permits the coupling of a luminous flux into the fibre.

The interference of two pumping light beams, at the wavelength $\lambda$, inclined in relation to one another at an angle $2\theta$ permits the creation of an interference field of spatial period:

$$I = \frac{\lambda_p}{2n\sin\theta}$$

where n is the index of the medium and $\lambda_p$ the wavelength of the beams referred to as the pumping beams in this medium.

The proportion of the luminous flux extracted in relation to the luminous flux incident on the Bragg lattice is a function of the wavelength of the incident flux 6 and of the intensity of the pumping wave.

As already mentioned, an important feature of the invention is designed so that the Bragg lattice or grating 7 is produced at the same moment when the interference fringes 4 of the pumping wave are formed and that it disappears when these fringes are suppressed. In a similar manner, this Bragg lattice has characteristics which evolve when the characteristics of the interference fringes vary.

Numerous means are capable of being utilized both for the production of the interference fringes 4 and for the variation or the adjustment of their properties.

Preferably, two-wave interference fringes are utilized. Such fringes are produced by separation of an incident luminous flux $\phi$ into two waves $\phi_1$ and $\phi_2$, and then recombination of these two waves $\phi_1$ and $\phi_2$ at the location of the fibre 1.

The interference fringes are obtained under good conditions, that is to say that they are plane with a high degree of precision when the fibre is placed in a medium having an index close to its own and having at least one plane contact surface with the air or the medium in which the pumping waves propagate. The fibre may be inserted into a silica element pierced by a hole provided for this purpose (it is possible to form a hole having a diameter of approximately 128 $\mu$m in the case of fibres having a diameter of 125 $\mu$m). An index gel or liquid ensures the continuity of index between this block and the sheath of the fibre.

The fibre may also be placed in a liquid medium having an index close to that of its sheath.

Thus, the pumping beams traverse only a plane dioptric system before interfering.

The variation or the adjustment of the interference fringes may first of all be produced by the relative displacement of the interference fringes 4 and of the fibre 1. A translation of the fibre parallel to the strata of the lattice of interference fringes, that is to say also of the Bragg lattice, modifies the length of the Bragg lattice and thus the fraction of the incident flux 6 extracted or reflected by the Bragg lattice 7, as well as the chromatic pass band of the lattice.

Figure 2:
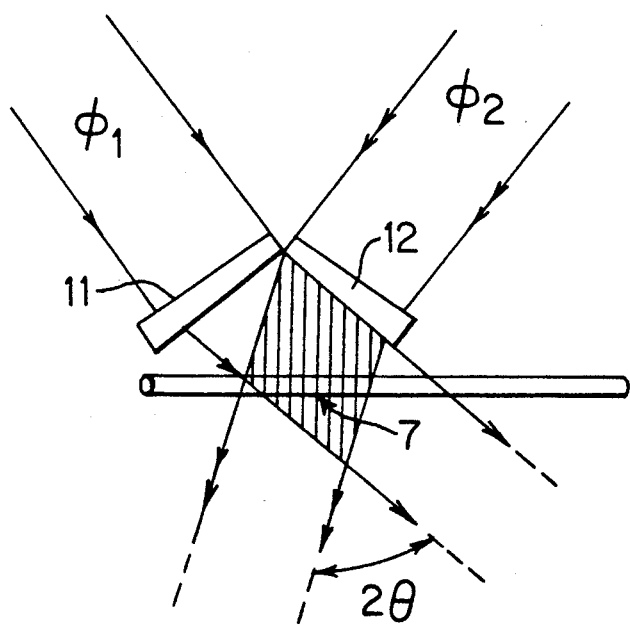
FIG. 2 represents a mode of adjustment and of control of the fringes

The remote measurement of this reflected or extracted flux accordingly permits the establishment of the relative positions of the interference fringes 4 and of the fibre 1 and the establishment, hence, of an external parameter P which is capable of having an effect on this relative position In another embodiment represented in FIG. 2, one or more prisms 10, 11 may be placed respectively on the two waves prior to the production of the interferences. The presence or the orientation of these prisms produces a modification of the conditions of interference and of the fringes produced, and thus of the Bragg lattice.

It is also possible to interpose on at least one of the waves a diasporametric device composed of a pair of counter rotating prisms permitting the constitution of components similar to a prism, the angle of which would be continuously variable The variation of this angle has an effect on the properties of the interferences produced, and thus of the Bragg lattice, and consequently permits the modification of the spatial period and/or the orientation of the strata of the Bragg lattice and thus permits the measurement of the relative angle of the prisms making up the diasporametric device and of a possible external parameter P producing a variation of this angle.

Figure 3:
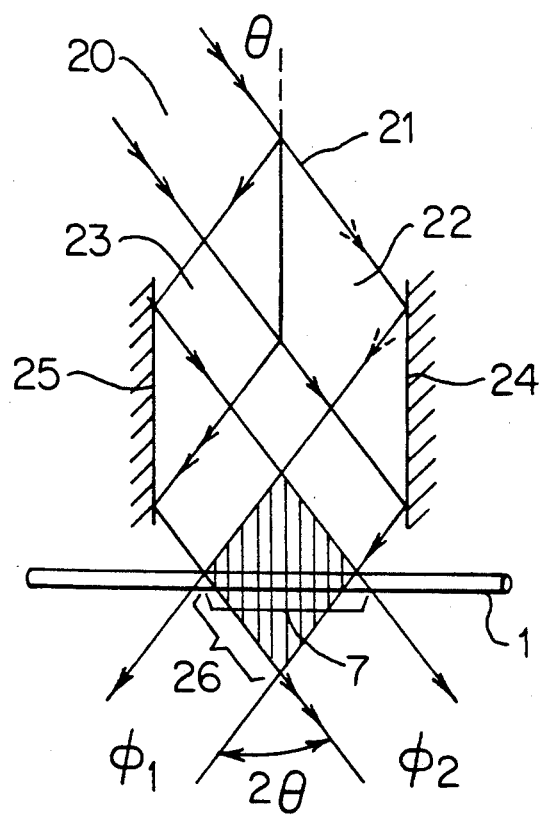
FIG. 3 represents first embodiment of the interferences

FIG. 3 represents a particularly simple embodiment permitting the creation of the interference fringes at the location of the fibre 1. An incident flux 20 forming a parallel beam is broken down by a semi transparent plate 21 into two waves 22, 23 which are approximately perpendicular. Each one of these waves is reflected by a mirror 24, 25 respectively which is approximately parallel to the semi transparent plate 21. The beams 22 and 23 recombine and form the interference fringes 26. A modification of the relative orientations of the semi transparent plate 21, and of the mirrors 24 and 25 produces a variation of the angle of the two wares 22 and 23 in the course of their recombination, and thus a variation of the spatial period of the interferences formed. These relative positions of the semi transparent plate 21 and of the mirrors 24 and 25 may be representative of a parameter to be measured P.

Figure 4:
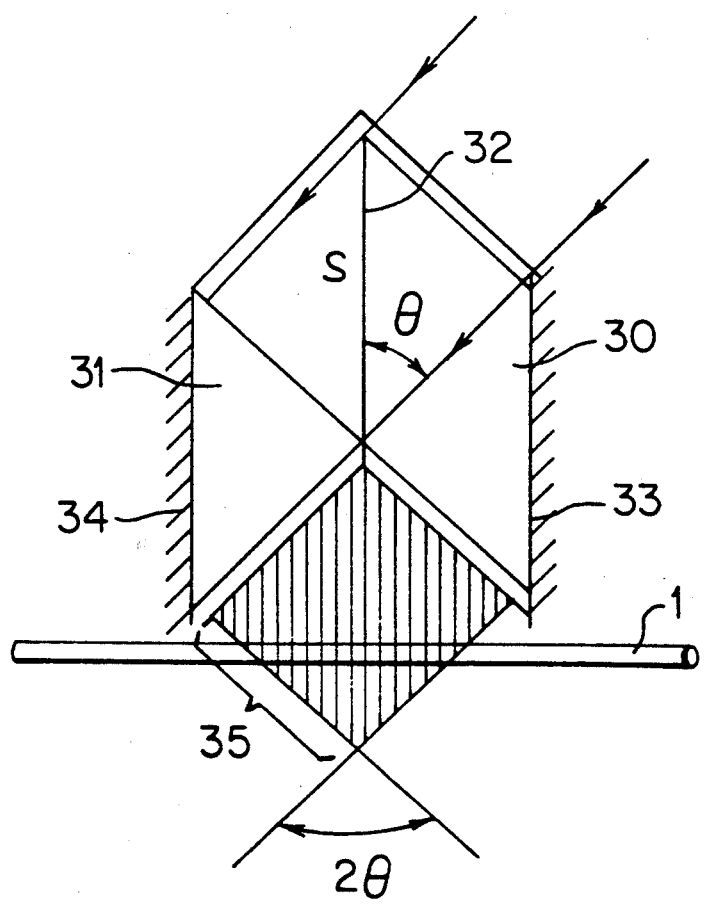
FIG. 4 represents a second embodiment of the interferences

The device represented in FIG. 4 is a monolithic device constructed from two parallelepipedes 30, 31 permitting the formation of the semi transparent plate 32, and of the mirrors 33 and 34 and forming an optical system similar to that described hereinabove with reference to FIG. 3. However, this device is very stable and insensitive to any possible external vibrations. The global position of this component has an effect on the relative position of the interference fringes 35 in relation to the fibre 1, permitting the control and the adjustment both of the length of the Bragg lattice and also of its spatial period and/or its orientation in relation to the axis of the fibre.

Figure 5:
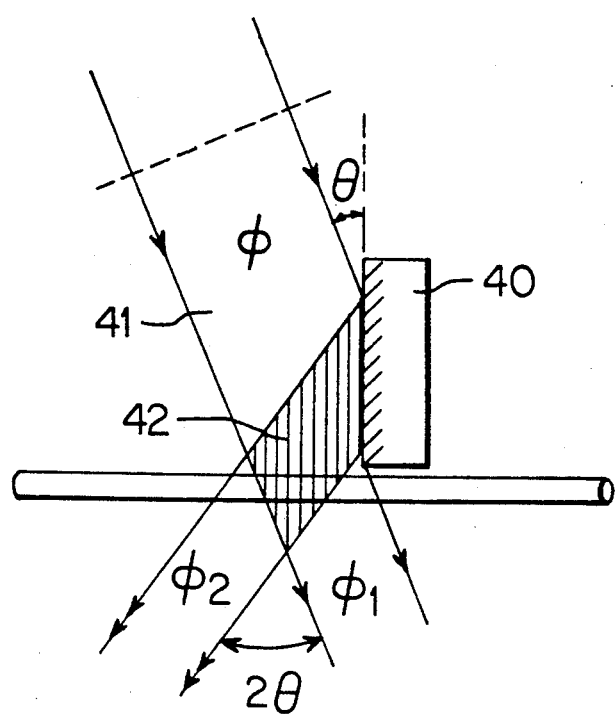
FIG. 5 represents a third embodiment of the interferences

In the device represented in FIG. 5, a mirror 40 intercepts a part of a parallel beam 41 and produces interference fringes 42 between the direct beam, not intercepted by the mirror 40 and the beam reflected by this mirror 40. This device is of a very high degree of simplicity.

Figure 6:
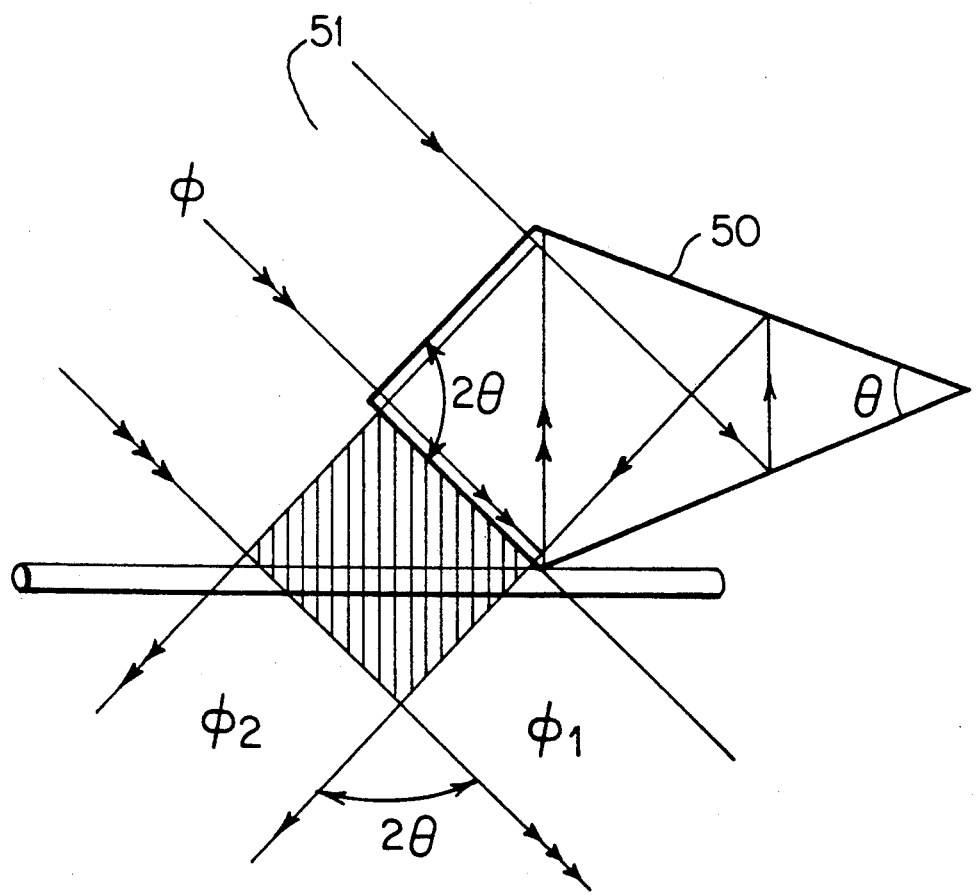
FIG. 6 represents a fourth embodiment of the interferences.

In the device represented in FIG. 6, an optical corner element 50 produces the interference of a part of the parallel flux 51 intercepted by this corner element with the directly transmitted flux. The angle of the interfering beams 2 $\theta$ results from the angle of the corner element $\theta$ fixed by design and thus particularly stable.

The characteristics of the interference field may be directly controlled in such a manner as to act on a signal wave coupled at the optical fibre.

In other embodiments, the characteristics of the interference field and thus of the Bragg lattice are dependent upon one or more external parameters. The flux coupled at the fibre is utilized for the purpose of remotely measuring the characteristics of the lattice and thus establishing the external parameter or parameters upon which they depend.

In these various devices, the control of the intensity of the pumping source or the interposition of attenuations on one or both pumping beams prior to recombination makes it possible to act on the intensity and on the contrast of the interferences produced, and consequently on that part of the flux of the signal wave which is deflected or extracted and on the amplification level of this signal wave. Moreover, the spatial period of the interferences of the pumping wave determines the centre wavelength of the spectral band on which the Bragg lattice is effective; the number of strata formed determines the bandwidth It is also possible to act on the wavelength of the pumping wave.

Various materials are known per se for the construction of the active fibres and may be utilized for the production of the core of the fibres employed according to the invention. The following table gives, for a certain number of materials, the dopant which is preferably utilized, the operating wavelength $\lambda_u$ and the pumping wavelength $\lambda_p$ which is employed for the purpose of forming the interferences in these devices:

| Fiber Material | Dopants | $\lambda_u$ (nanometer) | $\lambda_p$ (nanometer) Pumping wavelength |
|---|---|---|---|
| Zirconium fluoride glass | Erbium +++ $E_r$ | 850 | 801 |
| Zirconium fluoride glass | Neodymium +++ $N_d$ | 1300 1338 | 795 |
| Silica $SiO_2 + GeO_2$ or alternatively $SiO_2 + GeO_2 + AL_2O_3$ | Erbium ++++ $E_r$ | 1550 1536 | 1470–1510; 1480 514; 532 800–825; 820 980 |

Preferably either the core of the optical fibre is constructed of zirconium fluoride glass doped with erbium, the interference fringes are formed at a wavelength of between 790 and 820 nm and the component is intended to be utilized at a wavelength of between 810 and 860 nm.

or the core of the optical fibre is constructed of zirconium fluoride glass doped with neodymium, the interference fringes are formed at a wavelength of between 780 and 820 nm and the component is intended to be utilized at a wavelength of between 1250 nm and 1350 nm.

or the core of the optical fibre is constructed of silica doped with erbium, the interference fringes are formed at a wavelength of between 500 and 1510 nm and the component is intended to be utilized at a wavelength of between 1490 and 1570 nm.

The essential provision of the invention is thus the formation, within the core of optical fibres, of ephemeral Bragg lattices, that is to say Bragg lattices which are maintained only when the core of these fibres is subjected to an illumination which is variable and periodic in the direction of the axis of the fibre. It permits the real-time modulation of the properties of the Bragg lattice thus produced and receives numerous applications. This process can be applied to monomode fibres and to multimode fibres.

Figure 7:
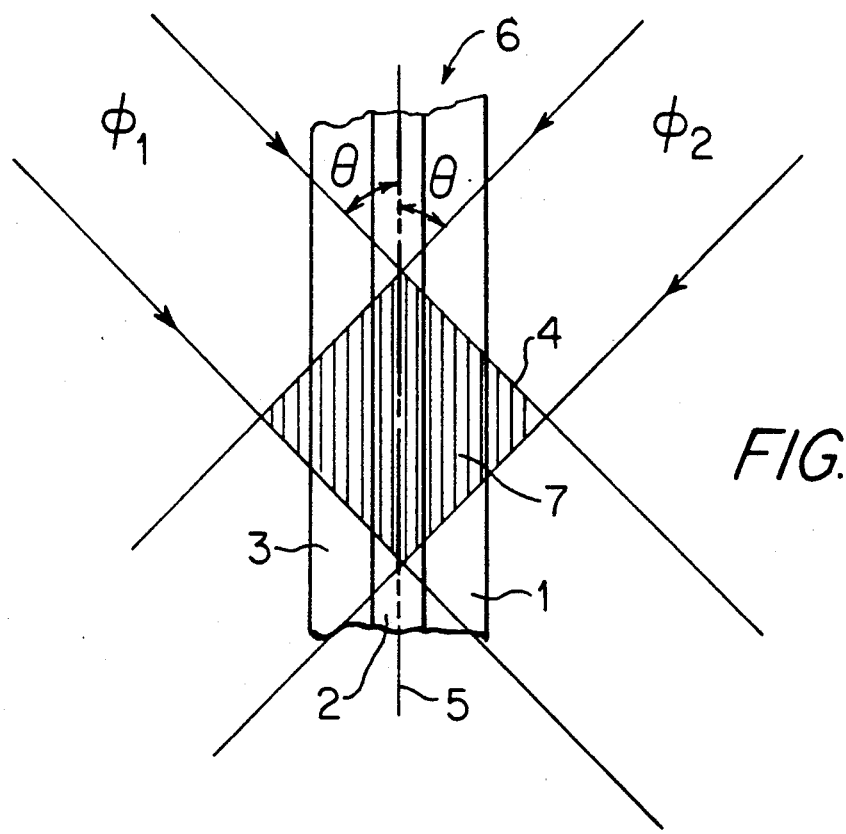
FIG. 7 represents a first embodiment of interferences parallel to the axis of the fibre.
Figure 8:
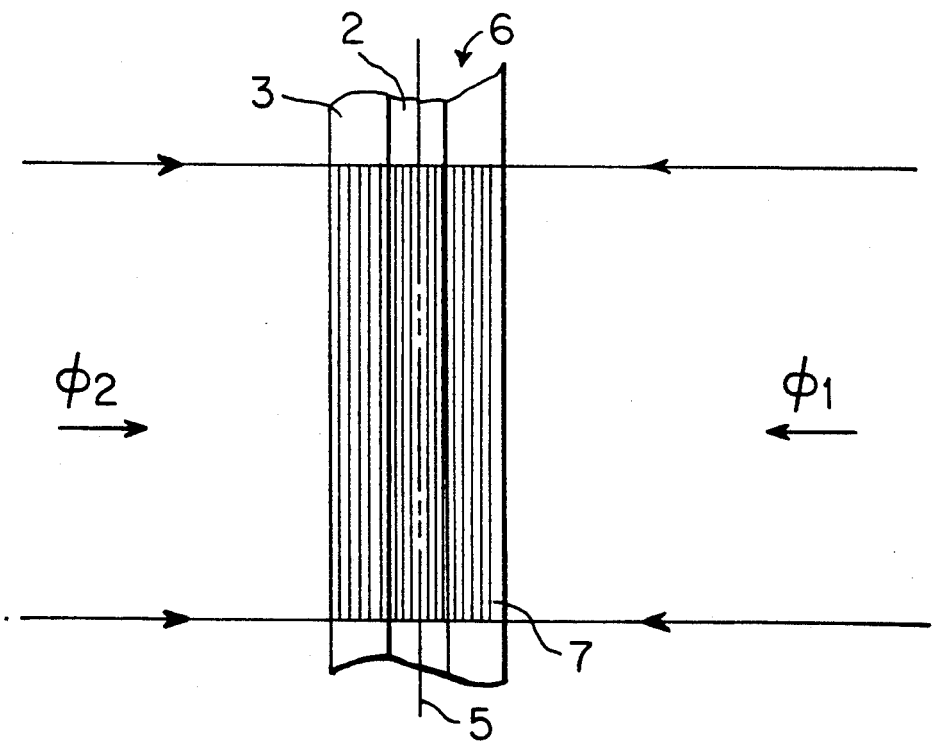
FIG. 8 represents a second embodiment of interferences parallel to the axis of the fibre.

When the variable interference field is parallel to the axis of the fibre, the Bragg lattice at least partially polarizes the signal wave guided within the fibre. Such an interference field is obtained, as shown in FIGS. 7 and 8, either by entering the interference field of two cylindrical pumping beams in such a manner that the axis of the fibre is parallel to the interference strata of the two beams from the interference of two beams, of which the bisector of the axes is parallel to the axis of the fibre (FIG. 7) or by the interference of two beams which are parallel, in opposite directions, to the axis of the fibre (FIG. 8).

The polarizes thus formed is variable. It may inter alia rotate about the axis of the fibre.

Strata which are slightly inclined parallel to the axis of the fibre may create almost grazing deflections; these constitute extractors or an injector-coupler of light.

Since each Bragg lattice reflects or deflects only a part of the signal flux coupled into the fibre a large number of lattices may be placed in series on the same fibre, permitting the measurement of a large number of parameters or, the chromatically selective extraction of channels forming part of a set of channels or chromatic multiplex circulating within the fibre, without disturbing the other channels. The extraction including the Bragg lattice may be characterized by its spectral response, itself represented by its centre wavelength $\lambda_c$ and its bandwidth $\Delta_c$. The variability of the Bragg lattice permits the control of $\lambda_c$ and of $\Delta\lambda_c$, which determine the selected channels (their wavelength and their number). In a similar manner, symmetrically, it is possible to insert chromatic channels within a fibre without disturbing the other channels of the multiplex.

Furthermore, an illumination of the fibre which is continuous or superposed upon the periodic illumination produces the amplification of the signal wave with a very broad pass band. This permits the multiplication, for a fixed intensity of the source, of the number of sensors utilized or enables the enhancement of the range of the lattice of sensors.

We claim:

1. An optical fiber device comprising:
   an optical fiber having a core and a sheath coaxial with said core, said core being made of a material which becomes light-amplifying when optically pumped; and
   means for producing interfering optical waves within said fiber, said waves having a predetermined intensity and wavelength, one of said waves comprising a pumping wave, for inscribing an ephemeral periodic index strata grating over at least a part of said fiber core when said core is illuminated by said interfering waves, said grating disappearing in the absence of said interfering waves.

2. A device according to claim 1 wherein said means for producing interfering optical waves comprises:
   means for separating an incident luminous flux into two optical waves; and
   means for deflecting said two waves towards said fiber, so said waves interfere therein for creating said grating within said fiber core, the orientation in relation to the axis of the fiber and the spatial frequency of said grating being a function of the position and the orientation of said means for deflecting.

3. A device according to claim 2 wherein said means for deflecting comprise at least one prism in the path of at least one of said two optical waves, between said means for separating and said optical fiber.

4. Device according to claim 2 wherein said means for deflecting comprises a diasporameteric device having a pair of counter rotating prisms in the path of at least one of said two optical waves, between said means for separating and said optical fiber.

5. A device according to claim 2 wherein:
   said means for separating comprises a movable semi-transparent plate interposed on said luminous flux, and
   said means for defecting comprise movable mirrors interposed on said optical waves between said semi-transparent plate and said optical fiber.

6. A device according to claim 1 wherein said means for producing optical waves comprises movable means for deflecting only a part of an incident luminous flux directed towards said fiber for obtaining two optical waves which interfere within said fiber core, for creating said strata grating therein, the grating orientation in relation to the axis of said fiber and the spatial frequency of said grating being a function of the position and orientation of said deflecting means.

7. A device according to calm 6 wherein said means for deflecting comprise a mirror disposed for intercepting only said part of said luminous incident flux, and reflecting it towards said fiber, so a non-reflected part of said luminous flux and a reflected part thereof interfere into said fiber.

8. A device according to claim 7 wherein said mirror is an optical corner element.

9. A device according to claim 6 wherein said means for defecting are disposed so as the bisector of said waves which interfere within said core is parallel to the axis of the fiber, thereby said index strata are each parallel to said axis.

10. An optical fiber device comprising:
an optical fiber having a core, and a sheath coaxial with said core, said core being composed of a material which is light-amplifying when optically pumped, said material selected from the group comprising: zirconium fluoride glass doped with erbium, zirconium fluoride glass doped with neodymium, silica doped with erbium;
means for producing optical waves interfering within said fiber, said waves having a predetermined intensity and wavelength, one of said optical waves comprising a pumping wave, for inscribing a ephemeral periodic index strata grating over at least a part of said fiber core, as long as said core is illuminated by said waves which interfere therein, said grating disappearing in the absence of illumination by said interfering waves; and
means for controlling the wavelength of at least said pumping wave, for forming a wavelength between 790 and 820 nm if said core is made of zirconium fluoride glass doped with erbium, or between 780 and 820 nm if said core is made of zirconium fluoride glass doped with neodymium, or between respectively 500 and 550 nm, 800 and 1000 nm or 1450 and 1510 nm if said core is made of silica doped with erbium.

11. An optical fiber device comprising:
an optical fiber having a core, and a sheath coaxial with said core, said core comprising material which becomes light-amplifying by optical pumping; and
means for producing optical waves interfering within said fiber, said waves having predetermined intensity and wavelength and comprising at least one pumping wave, for inscribing ephemeral index strata grating over at least a part of said fiber core, as long as said core is illuminated by said waves which interfere therein, said grating disappearing when said fiber is no longer being illuminated, said means for producing comprising means for deflecting at least a part of an incident luminous flux directed to said fiber for separating said flux into two optical waves interfering within said fiber.

12. An optical fiber according to claim 11 wherein:
said means for deflecting are movable, the orientation in relation to the axis of the fiber and the spatial frequency of said grating being a function of the position and the orientation thereof and comprise at least one of said following means: a mirror or an optical corner element; said means deflecting only a part of said incident luminous flux.

* * * * *